United States Patent
Male

[11] Patent Number: 6,034,496
[45] Date of Patent: Mar. 7, 2000

[54] MOTOR SPEED CONTROL USING FIXED-DURATION TORQUE BURSTS

[75] Inventor: Barry Male, West Granby, Conn.

[73] Assignee: Unitrade Corporation, Merrimack, N.H.

[21] Appl. No.: 09/133,051

[22] Filed: Aug. 13, 1998

[51] Int. Cl.[7] .................................................. H01R 39/46
[52] U.S. Cl. ........................ 318/439; 318/254; 318/807; 388/804; 388/928.1
[58] Field of Search .................................. 318/254, 439, 318/138, 798–812, 503, 504; 388/801–804, 809, 811, 928.1

[56] References Cited

U.S. PATENT DOCUMENTS

| | | | |
|---|---|---|---|
| 3,568,027 | 3/1971 | Bacon et al. | 318/331 |
| 4,078,194 | 3/1978 | Johnson, Jr. | 318/331 |
| 4,237,501 | 12/1980 | Barmache et al. | 360/75 |
| 4,350,940 | 9/1982 | Dupont et al. | 318/603 |
| 4,489,259 | 12/1984 | White et al. | 318/696 |
| 4,513,231 | 4/1985 | Kuno et al. | 318/341 |
| 4,536,809 | 8/1985 | Sidman | 360/77 |
| 4,724,369 | 2/1988 | Hashimoto et al. | 318/561 |
| 4,749,927 | 6/1988 | Rodal et al. | 318/599 |
| 4,812,724 | 3/1989 | Langer et al. | 318/599 |
| 4,949,201 | 8/1990 | Abed | 360/78.07 |
| 4,965,848 | 10/1990 | Vasconi et al. | 388/815 |
| 5,005,207 | 4/1991 | Grave et al. | 388/816 |
| 5,119,250 | 6/1992 | Green et al. | 360/78.06 |
| 5,168,398 | 12/1992 | Kanda et al. | 360/78.04 |
| 5,341,453 | 8/1994 | Hill | 388/815 |
| 5,473,725 | 12/1995 | Chen et al. | 318/254 |
| 5,543,697 | 8/1996 | Carobolante et al. | 318/594 |
| 5,586,306 | 12/1996 | Romano et al. | 395/500 |
| 5,631,999 | 5/1997 | Dinsmore | 388/805 |
| 5,654,840 | 8/1997 | Patton et al. | 360/78 |
| 5,659,231 | 8/1997 | Svarovsky et al. | 318/368 |
| 5,672,944 | 9/1997 | Gokhale et al. | 318/254 |
| 5,699,207 | 12/1997 | Supino et al. | 360/78.09 |

*Primary Examiner*—Brian Sircus
*Attorney, Agent, or Firm*—Weingarten, Schurgin, Gagnebin & Hayes LLP

[57] ABSTRACT

A motor controller controls motor rotational speed by repeatedly executing a sequence of operations. Initially, a pulse is generated that causes a predetermined fixed current to be supplied to the motor winding for a predetermined driving interval. The winding current is forced to zero after the pulse has occurred. A settling interval is allowed to pass in which the back EMF across the motor winding stabilizes, and then the winding back EMF is compared to a velocity command voltage representing the desired rotational speed of the motor. If at the end of the settling interval the back EMF is less than the velocity command voltage, indicating that the motor speed is less than the desired speed, then a new control cycle is begun, starting with the assertion of the current-driving pulse. However, if the back EMF of the motor winding exceeds the velocity command voltage at the end of the settling interval, indicating that the motor speed is greater than the desired speed, then the controller continues to supply zero current to the motor winding while the motor velocity decays. This velocity decay interval ends when the back EMF no longer exceeds the velocity command voltage, at which time a new control cycle is begun.

5 Claims, 2 Drawing Sheets

6,034,496

MOTOR SPEED CONTROL USING FIXED-DURATION TORQUE BURSTS

CROSS REFERENCE TO RELATED APPLICATIONS

Not Applicable

REGARDING FEDERALLY SPONSORED RESEARCH OR DEVELOPMENT

Not Applicable

BACKGROUND OF THE INVENTION

The invention is related to the field of controllers for direct current (DC) motors, such as motor controllers used in conjunction with voice coil motors used for read/write head positioning in disk drives.

In disk drives, it is common to control the motion of a read/write head across a recording medium by a type of direct-current (DC) motor known as a voice-coil motor or VCM. The operation of the VCM is in turn controlled by a control circuit referred to as a motor controller. Typically a form of feedback is used to enable the controller to precisely control head position and speed during normal operation of the disk drive. Data retrieved from the disk provides an indication of radial head position. This indication is used by the motor controller to compare actual head position and speed with desired values. The resulting difference values are used to modify the current flowing through the VCM winding, thus changing the head position and/or speed by changing the rotational speed of the VCM.

The above-described control technique using data feedback cannot operate when the head is not engaging the medium. This situation occurs, for example, when the head is being loaded onto the disk from a resting ramp, and when the head is being retracted from the disk onto the resting ramp. Accurate control of head speed is desired even during these periods in which the head is not engaging the medium. Such control minimizes the chances that either the heads or head stops adjacent to the ramps will be damaged.

To achieve this control, some prior-art motor controllers employ a microprocessor-based speed control circuit that is capable of accurately controlling motor speed without receiving data retrieved from the medium by the read/write head. Instead, the circuit operates by detecting the back electromagnetic force (back EMF or BEMF) of the VCM and then applying a complex speed control algorithm to generate the desired VCM current.

It is known to obtain a finite amount of electrical power from the a motor during periods in which normal operating power is lost but the motor is still spinning. In some disk drives this is done with the spindle motor. In effect, the motor is converted to use as a generator during these periods. For example, in one common scheme the motor's back EMF causes diodes in the motor controller's drive circuits to become forward biased, so that current flows from the motor coil into a power bus from which the drive signal portion of the motor control circuitry is powered. This residual power is used for special functions needed during such times. A common such feature is braking of the motor.

Head-positioning VCMs typically cannot generate enough power to operate a microprocessor and associated circuitry during power-loss periods. Therefore in microprocessor-based controllers, the microprocessor and related circuitry are usually powered separately from the power bus used for the motor drive signals. As a result, the microprocessor circuitry becomes inoperable when power is lost, and therefore the microprocessor-based speed control loop becomes inoperable as well.

It is important to accurately control head motion during loading and retraction even under power loss conditions. In fact, it is a normal operating feature of disk drives to retract the head when power is first lost, in order to avoid corrupting data on the disk. In the above-described prior motor controllers, however, the desired accurate control cannot be provided by the microprocessor-based control circuit when power to the disk drive is lost.

BRIEF SUMMARY OF THE INVENTION

A motor speed controller that can accurately control motor speed under a variety of conditions is disclosed. The motor controller relies upon switching principles rather than continuous control techniques, and thus does not require either position feedback information from disk read/write heads or a microprocessor to perform a complicated control algorithm. Thus the disclosed motor controller may be used for example to control a head-positioning voice-coil motor during load and retract operations even in the absence of normal power.

In operation, the motor controller repeatedly executes a sequence of control operations. Initially, a pulse is generated that causes a predetermined fixed current to be supplied to the motor winding for a predetermined driving interval. This current causes torque in the motor, and a concomitant increase in rotational speed. The winding current is then forced to zero by the absence of the pulse after the driving interval. After a settling interval has passed that allows the back EMF across the motor winding to stabilize, the back EMF is compared to a velocity command voltage representing the desired rotational speed of the motor. If at the end of the settling interval the back EMF is less than the velocity command voltage, indicating that the motor speed is less than the desired speed, then a new control cycle is begun, starting with the assertion of the current-driving pulse. However, if the back EMF of the motor winding exceeds the velocity command voltage at the end of the settling interval, indicating that the motor speed is greater than the desired speed, then the controller postpones the assertion of the next driving pulse maintaining winding current at zero for an interval during which the motor velocity slowly decays. This velocity decay interval ends when the back EMF no longer exceeds the velocity command voltage, at which time a new cycle is begun.

The motor controller can be implemented by discrete components that collectively can be powered by the motor during power-loss conditions, so that accurate control of head speed and position can be maintained. A circuit implementing the above control method, as well as other features of the presently-disclosed motor controller, is shown in the detailed description that follows.

DETAILED DESCRIPTION OF THE INVENTION

Figure 1:
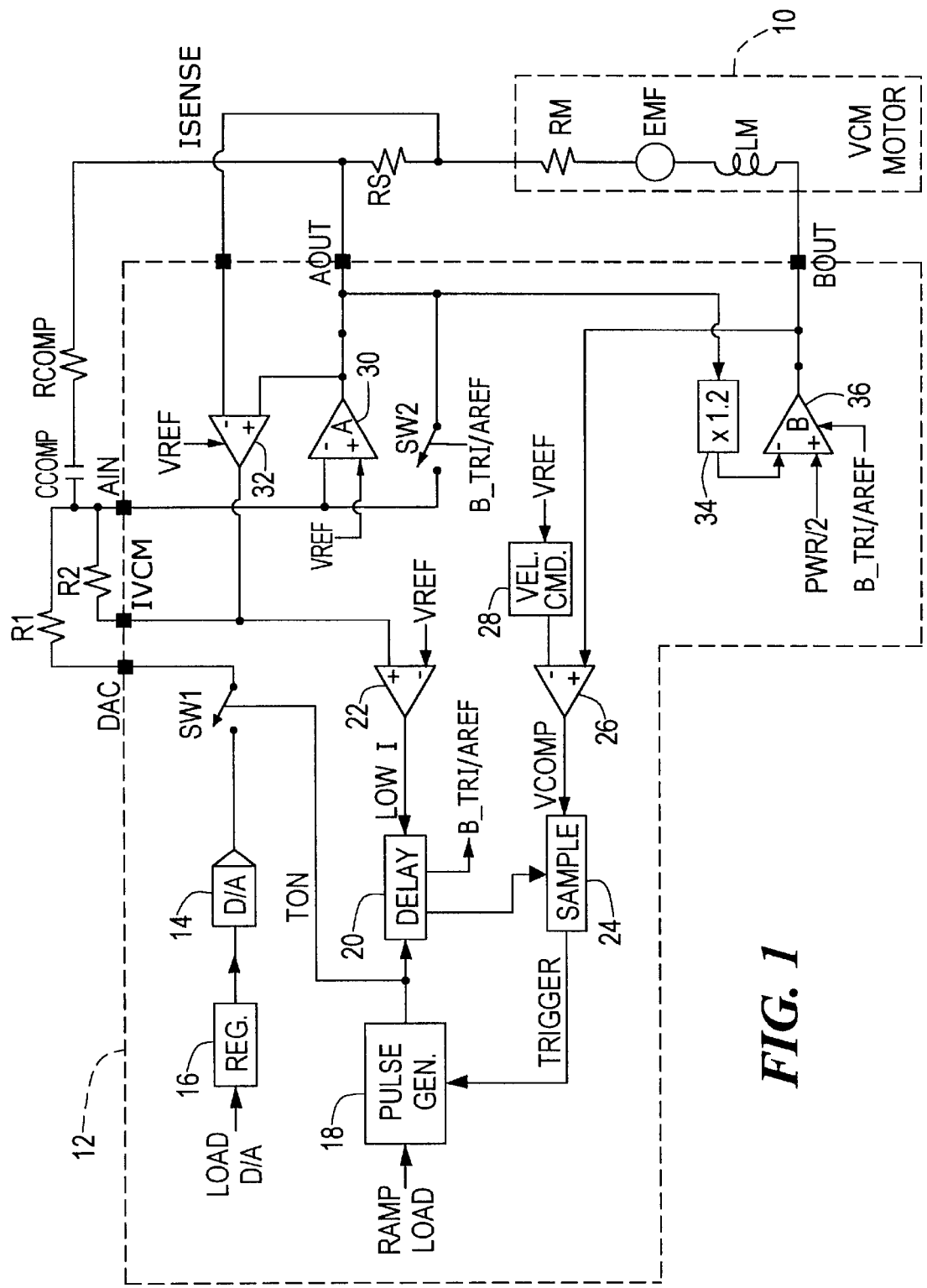
FIG. 1 is a schematic diagram of a motor speed controller in accordance with the principles of the present invention.

FIG. 1 shows a voice-coil motor (VCM) 10 being controlled by a motor controller having a number of circuit components. As indicated by the dashed line 12, several of the components are advantageously placed on an integrated circuit, while off-chip components are used to tailor the controller's operation to a particular motor. Contacts carrying signals to or from the integrated circuit are indicated with dark squares, for example the square associated with the signal DAC.

The motor controller operates to control the current in the VCM 10 in accordance with a command voltage provided by a digital-to-analog converter (D/A converter) 14. The D/A converter 14 is programmed via a register 16, loaded by a signal LOAD D/A. The loaded value represents a current, or torque pulse magnitude, to be supplied to the motor 10. The signal LOAD D/A represents an input from a higher-level controller, not shown herein, that establishes operating parameters for the circuit of FIG. 1. In alternative embodiments, the voltage at the output of the D/A converter 14 can be realized by other means, for example by a resistive divider or bandgap reference.

The VCM 10 is modelled as having a winding inductance LM, a winding resistance RM, and a back EMF source EMF. Typical values for these attributes in the illustrated embodiment are 2.1 mH, 13.9 ohms, and 10.25 V/KRPM respectively. Also, a typical value for the inertia of the VCM 10 in the illustrated embodiment is 4.15 N-m-sec$^2$. The VCM 10 is driven by two power amplifiers, an A amplifier 30 and a B amplifier 36. The A amplifier 30 is biased at a voltage VREF, which can be generated by any suitable means, such as a bandgap reference. In the illustrated embodiment, the value of VREF is 2.5 volts. The B amplifier 36 is biased at one-half the power supply voltage, a value represented in FIG. 1 as PWR/2. A block 34 represents a feedback circuit around the B amplifier 36 such that a gain of approximately 1.2 is obtained.

The A amplifier 30 serves as the summation component in a feedback loop including resistors R1 and R2, a sense resistor RS, and a compensation network consisting of capacitor CCOMP and resistor RCOMP. A current sense amplifier 32 provides DC feedback to the A amplifier 30 via resistor R2. In the illustrated embodiment the gain of the current sense amplifier 32 is 2.4. The compensation network consisting of capacitor CCOMP and resistor RCOMP provide lead compensation around the A amplifier to compensate for the mechanical lag of the load. Resistors R1 and R2 establish the relative scaling of command voltage DAC from the D/A converter 14 to load current ILOAD according to the following equation:

$$(DAC-VREF)/R1=((ILOAD*RS*2.4)-VREF)/R2$$

A switch SW1 is controlled by a pulse signal TON generated by a one-shot pulse generator 18. The signal TON is also provided to a delay circuit 20, which also receives a signal LOW I from a current decay comparator 22. The output of the delay circuit 20 is a signal SAMPLE VELOCITY used to control a velocity sampling circuit 24. The velocity sampling circuit 24 receives as input a signal VCOMP generated by a velocity comparator 26, and provides as output a signal TRIGGER that triggers the pulse generator 18 to generate the pulse signal TON. The signal VCOMP from comparator 26 indicates whether the back EMF of the motor winding 10 exceeds a command voltage generated by a velocity command circuit 28. The output from circuit 28 sets the back EMF regulation of the loop, and therefore the speed of the VCM 10.

A switch SW2 is used during a phase of operation described below in which the output of the B amplifier 36 is tri-stated so that the back EMF of the VCM 10 may be sensed. When the switch SW2 is closed, the A amplifier forces the voltage at AOUT to be equal to VREF. This in turn forces the back EMF to be referenced to VREF. The velocity command circuit 28 is also referenced to VREF. Therefore, both the inputs to the velocity comparator 26 are referenced to VREF, so the output of the comparator 26 represents only the difference between the actual back EMF and the back EMF commanded by circuit 28.

The operation of the motor controller of FIG. 1 is now described with reference to FIGS. 1 and 2. Initially, the D/A register 16 and the pulse generator 18 are loaded with values indicating the desired amplitude and duration of the current pulse that is to be provided to the motor winding. Additionally, the output of the velocity command circuit 28 is set to a value indicating the desired rotational speed of the motor 10.

The motor speed control sequence then begins with the assertion of a signal RAMP LOAD. In the illustrated embodiment, the signal RAMP LOAD is generated by the higher-level controller when the head is to be parked, for example in response to a fault condition. The signal TON is asserted for a predetermined time TON TIME. Switch SW1 closes so that the current command signal DAC takes on a value corresponding to the value programmed in the register 16. In response, the signals AOUT and BOUT take on large values of opposite polarity, and motor winding current begins to flow, as illustrated in FIG. 2 by the increase in the signal IVCM. The winding current soon saturates and is maintained at the saturated value during the remainder of the time TON TIME, so that the motor rotational speed as indicated by the waveform labelled VELOCITY gradually increases throughout the TON TIME.

The signal TON becomes deasserted after a fixed time TON TIME has elapsed, signalling the end of the interval during which the motor winding is supplied with drive current. Switch SW1 is opened, so that current no longer flows through resistor R1. Several things happen as a result. The signals AOUT and BOUT oscillate for a short period IDECAY during which the motor winding current falls toward zero, as indicated by the signal IVCM from current sense amplifier 32. When the VCM current is low enough as indicated by the signal IVCM, the signal LOW I from comparator 22 becomes asserted. This signals the beginning of a settling delay interval in the delay circuit 20, indicated by the waveform labelled SAMPLE DELAY. The settling delay interval allows the back EMF of the motor to reach a stable value before being sampled. The assertion of the signal LOW I also results in the assertion of the signal B_TRI/A_REF, which tristates the B amplifier 36 so that the back EMF can be accurately sensed.

During the settling delay interval, the signal AOUT takes on the value VREF, and the signal BOUT takes the value (VREF+back EMF). Because VREF is a component of both differential inputs to the velocity comparator 26, the signal VCOMP from comparator 26 is a function solely of the difference between the actual motor speed as represented by the back EMF at BOUT and the desired motor speed as represented by the output from command circuit 28. The signal VCOMP is a binary indication of whether the actual motor speed exceeds the desired motor speed.

At the end of the settling delay interval SAMPLE DELAY, the velocity sampling circuit 24 samples the signal VCOMP. At this time in the first cycle shown in FIG. 2, the signal VCOMP is a logic low, indicating that the motor rotational speed is less than the desired value. In this case the signal TRIGGER becomes asserted, indicating that a new cycle of the speed control sequence is to begin. A second control cycle then begins, starting with the current-driving interval that coincides with the assertion of the signal TON as described above.

Figure 2:
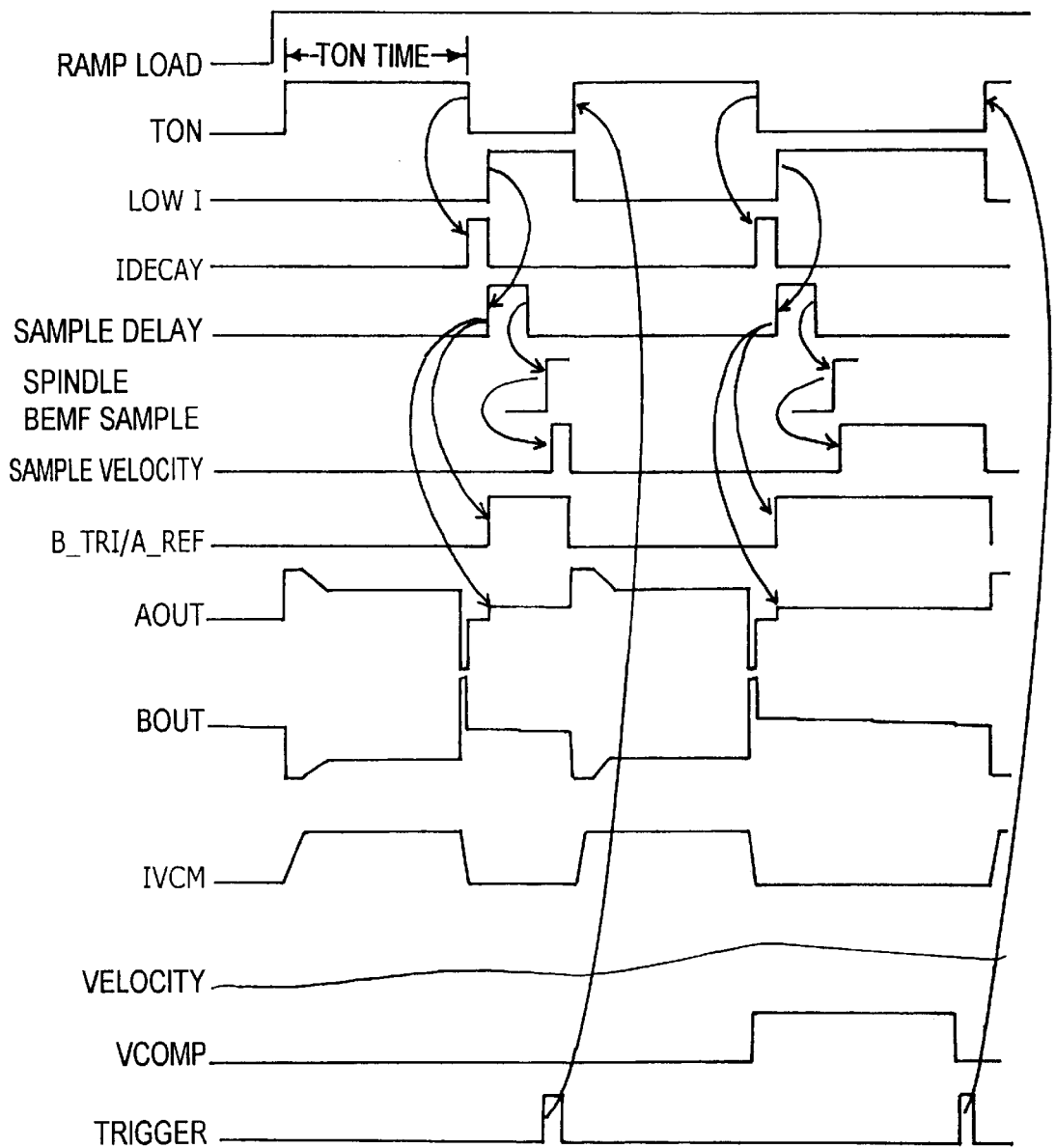
FIG. 2 is a timing diagram of several signals appearing in the controller of FIG. 1.

During the second speed control cycle shown in FIG. 2, the motor velocity increases further. In this case, at the time when the signal SAMPLE VELOCITY becomes asserted, the signal VCOMP is also asserted, indicating that the rotational speed of the motor exceeds the desired rotational speed. As a result, the signal TRIGGER is not asserted immediately as in the first cycle. Because the B amplifier 36 is tri-stated, the motor slows toward the desired speed, as indicated by the decrease in the back EMF signal at BOUT. The signal SAMPLE VELOCITY is maintained asserted while the motor velocity decays. When the motor speed diminishes past the desired speed, the signal VCOMP becomes deasserted, resulting in the assertion of the signal TRIGGER and the beginning of a new driving cycle.

The foregoing has described a sampled system that measures a zero-current back EMF and applies fixed width current (torque) pulses to a VCM motor to maintain constant back EMF or speed. The invention may be applied to other types of DC motors, such as a direct drive capstan motor in a tape drive system. Also, the polarity and duration of torque pulses can be tailored to the desired response of the system. It may be advantageous in alternative embodiments to apply both positive and negative torque pulses to the motor.

It will be apparent to those skilled in the art that modifications to and variations of the above-described motor speed controller are possible without departing from the inventive concepts disclosed herein. Accordingly, the invention should be viewed as limited solely by the scope and spirit of the appended claims.

I claim:

1. A method of controlling the rotational speed of a motor, comprising the steps of:

providing a predetermined current to a winding of the motor for a predetermined driving interval;

providing zero current to the motor winding for a settling interval after the driving interval, the settling interval being sufficiently long to allow the back electromagnetic force (back EMF) across the motor winding arising from winding current to reach a stable value;

at the end of the settling interval, comparing the back EMF across the motor winding to a velocity command voltage representing a desired rotational speed of the motor;

if at the end of the settling interval the back EMF does not exceed the velocity command voltage, then repeating the foregoing steps at the end of the settling interval; and if at the end of the settling interval the back EMF of the motor winding exceeds the velocity command voltage, then performing the steps of:

(i) comparing the back EMF across the motor winding to the velocity command voltage while maintaining zero current to the motor for a velocity decay interval ending when the back EMF no longer exceeds the velocity command voltage; and (ii) repeating the foregoing steps at the end of the velocity decay interval.

2. A method according to claim 1, further comprising the step of detecting when the current in the motor winding is less than a predetermined small value, and wherein the settling interval begins when the current in the motor winding is detected to be less than the small value.

3. A motor speed controller, comprising:

a one-shot pulse generator operative to generate a pulse signal of predetermined duration in response to a trigger signal;

a switchable current source coupled to the pulse generator, the current source being operative to provide (1) a predetermined current to a winding of the motor during the assertion of the pulse signal, and (2) zero current to the motor winding during the de-assertion of the pulse signal;

a delay circuit coupled to the pulse generator, the delay circuit being operative to generate a velocity sampling signal, the velocity sampling signal becoming asserted at a time after the de-assertion of the pulse signal when the back electromagnetic force (back EMF) across the motor winding arising from winding current has reached a stable value, and the velocity sampling signal becoming deasserted upon the assertion of the pulse signal;

a velocity comparator operative to compare the back EMF across the motor winding to a velocity command voltage representing a desired rotational speed of the motor; and a sampling circuit coupled to the output of the comparator and to the output of the delay circuit, the sampling circuit being operative to sample the output of the velocity comparator during the assertion of the velocity sampling signal and to generate the trigger signal when the sampled output of the comparator indicates that the back EMF across the motor winding does not exceed the velocity command voltage.

4. A motor speed controller according to claim 3, further comprising a current decay comparator operative to detect when the current in the motor winding has decayed to substantially zero, and wherein the delay circuit is operative to assert the velocity sampling signal a predetermined settling delay time after the current in the motor winding has decayed to substantially zero.

5. A motor speed controller according to claim 3, wherein the switched current source comprises:

an error amplifier having an output coupled to one terminal of the motor winding through a sense resistor;

a tri-state amplifier having an inverting input coupled to the output of the error amplifier, the tri-state amplifier also having an output coupled to the other terminal of the motor winding, the output of the tri-state amplifier being placed in a high-impedance state during the deassertion of the pulse signal;

a current sense amplifier having differential inputs connected across the sense resistor, the current sense amplifier also having an output coupled to an inverting input of the error amplifier by a first resistor;

a digital-to-analog (D/A) converter operative to generate a current command voltage corresponding to the predetermined current; and a switch operative to couple the current command voltage to the inverting input of the error amplifier by a second resistor during the assertion of the pulse signal, the second resistor having a resistance that in conjunction with the resistance of the first resistor establishes the correspondence between the current command voltage and the predetermined current;

and wherein the delay circuit is operative to tri-state the output of the tri-state amplifier during an interval beginning after the de-assertion of the pulse signal and ending upon the de-assertion of the velocity sampling signal.

* * * * *

UNITED STATES PATENT AND TRADEMARK OFFICE
CERTIFICATE OF CORRECTION

PATENT NO    :    6,034,496
DATED        :    March 7, 2000
INVENTOR(S)  :    Barry Male It is certified that error appears in the above-identified patent and that said Letters Patent are hereby corrected as shown below:

Title page, item [73] Assignee reads "Unitrade Corporation"

should read --Unitrode Corporation--.

Signed and Sealed this

Tenth Day of April, 2001

*Attest:*

NICHOLAS P. GODICI

*Attesting Officer*      *Acting Director of the United States Patent and Trademark Office*